INVENTORS
ULRICH RAYDT
KARL HEINZ HAHNE
BY Robert A. Burns
ATTORNEY

INVENTORS
ULRICH RAYDT
KARL HEINZ HAHNE
BY Robert L Burns
ATTORNEY

INVENTORS
ULRICH RAYDT
KARL HEINZ HAHNE
BY
ATTORNEY

United States Patent Office 2,964,090
Patented Dec. 13, 1960

2,964,090

TOOL AND APPARATUS FOR PRODUCING CABLE SHEATHS

Ulrich Ernst Raydt, Osnabruck, and Karl Heinz Hahne, Korntal, Kreis Leonberg, Germany, assignors to Osnabrucker Kupfer- und Drahtwerk, Osnabruck, Germany, a corporation of Germany Original application Oct. 17, 1952, Ser. No. 315,305, now Patent No. 2,852,597, dated Sept. 16, 1958. Divided and this application Sept. 12, 1958, Ser. No. 760,779

Claims priority, application Germany October 22, 1951

1 Claim. (Cl. 153—71)

This invention relates to a tool and to apparatus for the production of corrugated cable sheaths from a metal having a higher melting point than lead.

Cable sheaths made of a metal having a higher melting point than lead are generally given a corrugated profile, so that the sheath receives the necessary flexibility. In our U.S. Patent No. 2,852,597, dated September 16, 1958, we have described a corrugated cable sheath of this type comprising expansible and intervening non-expansible elements or portions, the non-expansible elements having a substantially cylindrical shape and resting upon the cable core, and the expansible elements being arched outwardly away from the core. The height $\delta$ of the arch of every expansion element is about $$\sqrt{\frac{1}{4(k+1)^2}+\frac{v}{2(k+1)}}$$

times the aggregate breadth $h$ of one expansible element and one non-expansible element measured in the direction of the cable axis, $h$ thus being the pitch of the expansible elements, for a minimum bending diameter $D$ equal to $k$ times the outside diameter $d$ of the cable, $k$ being the ratio of the minimum bending diameter to the outside diameter of the cable and $v$ being the ratio between the breadth of each expansible portion to the pitch of the expansible portions or the height $\delta$ of the arch of every expansible element is about 0.14 of the aggregate breadth of one expansion and one non-expansible element measured in the direction of the cable axis, for a minimum bending diameter equal to ten times the outside diameter of the cable, and the breadth of every expansion element is about 0.38 of the pitch of the corrugations. The resulting $\Omega$-like profile of the corrugations is such that the arched expansible elements can flatten out to rest upon the core when fully expanded by bending of the cable.

The present invention relates to a tool and apparatus for the production of helically corrugated cable sheaths of such $\Omega$-like profile from cylindrical tubes made of metals having a higher melting point than lead, e.g. aluminum, the tool comprising a helical band or a set of helically arranged rollers, in the form of an Archimedean spiral. The ratio of the band or roller breadth to the distance between opposite portions of the tool spaced circumferentially by a complete turn of the helix, is approximately 0.62 to 0.38, and the radii of the Archimedean spiral at two points separated by one complete turn of the helix differ in length by about $$\sqrt{\frac{1}{4(k+1)^2}+\frac{v}{2(k+1)}}$$

of the pitch $h$ for a minimum admissible bending diameter $D$ equal to $k$ times the outside diameter $d$ of the cable, or they differ in length by about 0.14 of the pitch for a minimum admissible bending diameter equal to ten times the outside diameter of the cable.

The invention will be hereinafter described with reference to the accompanying drawings, wherein, Fig. 1 is a diagrammatic view of an electric cable coiled about a circle of small diameter.

Figure 1:
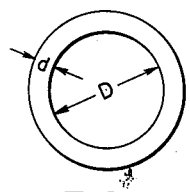

When a cable of diameter $d$ is bent around a circle of minimum admissible bending diameter $D$, as shown in Figure 1, the diameter of the neutral axis of the cable is $D+d$. If the cable is to be sheathed with a metal having a higher melting point than lead, e.g. aluminum, the most favorable properties of the sheath, and particularly its flexibility, will be obtained with a sheath possessing the $\Omega$-like profile shown in Fig. 2, in the form of a helical corrugation comprising in longitudinal section expansible and non-expansible elements, the expansible elements being arched outwardly from the cable core like a bellows, and the non-expansible elements resting upon the core, as described in our Patent No. 2,852,597.

Figure 2:
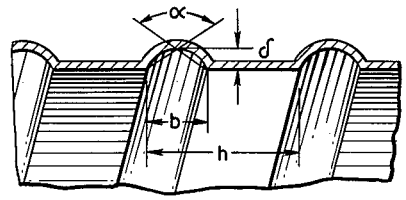
Fig. 2 is a partial sectional view on a larger scale of a portion of the cable sheath corrugated helically to $\Omega$-like profile by a tool and apparatus according to the present invention.

In Fig. 2, the width of the expansible element or bellows is indicated as $b$, the pitch of the helical corrugation as $h$, and the height of the bellows or expansible arch as $\delta$. With this profile of the cable sheath 1, the proportion $b/h$ has the approximate value of 0.38, and the proportion $(h-b)/h$ the approximate value of 0.62. The height $\delta$ of the bellows, representing the amount of radial deformation of the cylindrical tube from which the sheath is produced, is about $0.14h$, if the smallest admissible bending diameter of the cable is to be equal to ten times the cable diameter.

Figure 3:
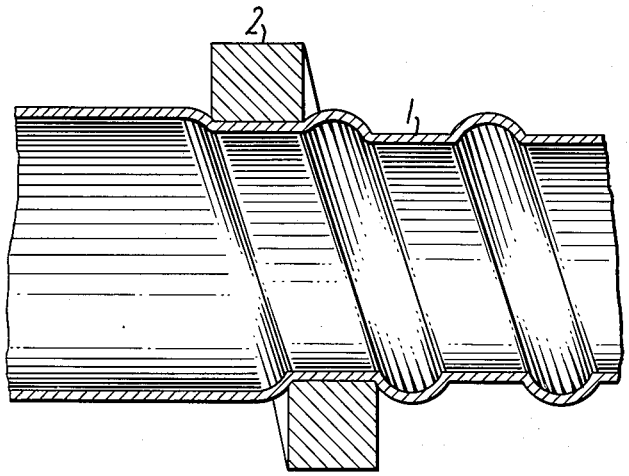
Fig. 3 is a sectional view showing the corrugating of the sheath by means of a metal deforming tool.

Fig. 3 shows in section a rotary motor-driven tool formed in accordance with these values for the production of the corugations of $\Omega$-like profile in a cylindrical tube, which is deformed with the tool. The device holding the rotary forming tool can be movable along the tube while the tube is laid out on a base, or it may be stationary and mounted beside the mouthpiece of a tube-extrusion press or a machine for the production of the sheath from a metal strip or for the shrinking of a sheathing tube enclosing a cable core. With this profiled tool, a relatively wide cylindrical part (Fig. 2, width $h-b$) of the sheath is pressed closely on to the cable core during the step of corrugating the metal tube. Substantially only this pressed-in and non-expansible part is mechanically deformed, whereas the arched portions (Fig. 2, width $b$) are merely curved, so that they are work-hardened only to a small extent.

The forming tool may consist of a wide metal band wound helically, or of a plurality of helically arranged steel or other metal rollers. The band or roller breadth is equal to the width $h-b$, which is greater than the distance between opposite portions or faces A, B of the tool spaced circumferentially by a complete turn of the helix, the distance A—B being at least equal to the width $b$ of the bellows or expansible portion. Preferably, these opposite portions of the tool are spaced apart axially by about 38% of the pitch $h$. The ratio of the band or roller breadth $(h-b)$ to the distance $(b)$ between the opposite portions or faces (A, B) of the tool, spaced circumferentially by a complete turn of the helix, is approximately equal to 0.62:0.38, these being the respective fractions of the pitch $(h)$.

The interior of the metal strip or the common internal tangent of the helically-arranged rollers has the form of an Archimedean spiral. The radii of the Archimedean spiral at two points separated by one complete turn of the helix differ in length by about 0.14 of the pitch for a minimum admissible bending diameter equal to ten times the diameter of the cable.

In Figure 3, reference numeral 1 indicates the portion of the sheath pressed closely inwards and adapted to rest upon the cable core (not shown), 2 is the helically wound and spirally-arranged rotary forming tool, moving towards the left relatively to the tube on which it is engaged.

Figure 4A:
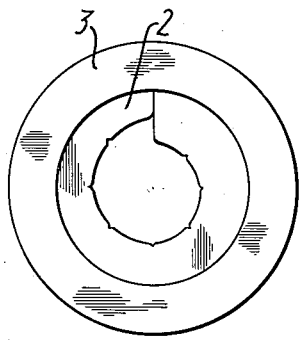
Fig. 4a is an end view of the tool shown in Fig. 4.
Figure 4:
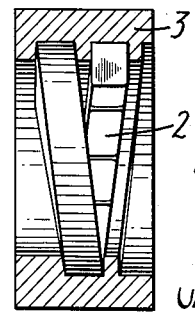
Fig. 4 is an axial sectional view of the corrugating tool.

Figures 4 and 4a show a holding device 3 for the wide helically wound tool 2 or the helically arranged forming rollers to be inserted therein. The device consists of a sleeve with a screw thread 3a turned therein, into the groove of which the helically wound and spirally formed strip or forming tool 2 is appropriately fixed, or in which the rollers are inserted. As will be understood, the helically wound tool 2, can be integral with this sleeve and cut directly therein. Preferably the holding device is divided diametrically so that it can be set in place upon the sheath tube from the exterior, and can also be adjusted if necessary, the individual parts then conveniently being kept under spring pressure. This resilient mounting is of particular advantage in the manufacture of high-tension cables impregnated with compounds of various known types, since the tool can then yield resiliently, if the pressure becomes too great, due to the compound damming up or to any unavoidable irregularities of the core diameter. It is also possible to produce a resilient effect by securing the helical metal strip 2 on one side only.

As best seen in Figure 4a, the inner contour of the helical tool can be interrupted, as by transverse grooves 2a in order to reduce friction. The rise of the spiral which constitutes the inner contour of the forming tool, is expediently made greater for cables having their cores impregnated with an insulating oil or like compound than in other cables with unimpregnated cores. It is then possible for the cable to perform an eccentric movement within the forming tool, if the impregnating compound dams up in the sheath. In the eccentric movement, the axis of the cable moves away from the shortest chord of the spiral, namely the vertical spiral axis marked in Figure 4a, and shifts to another chord of greater length. The diameter of the non-expansible elements or cylindrical parts (Figure 2, $h-b$) of the sheath can thus be adapted to the volume of impregnating compound at the point of the cable where the forming tool acts.

This capacity for adjustment can be increased by rotating the forming tool at a speed dependent upon the resistance load, for example by a series-wound electric motor. The faster the forming tool rotates, the more centrally will the cable run. If resistance increases, due to damming up of the compound, the forming tool runs more slowly, and thus renders it easier for the cable to move to an eccentric position relative thereto.

In the deformation of the metal tube to form a corrugated sheath, the tool-holder 3 is screwed over the sheath tube together with the screw-threaded ring or forming tool 2. This can be effected while the seamless tube coming from the sheath press is pressed about the cable core, or after the sheath tube has been produced from a metal strip, or while the laid out tube, into which the cable core has been drawn, the portions of the metal tube deformed by the forming tool are pressed closely upon the core by means of the forming tool. In this operation the device with the forming tool can be stationary, or can be moved along the tube. Due to the rotation of the forming tool, there will be a certain torque acting upon the tube, which torque can be resisted if the tube is chucked or clamped at the end, or if simultaneously with the rotation of the forming tool a further tool is provided for exerting a contrary torque acting against the first.

Figure 5:
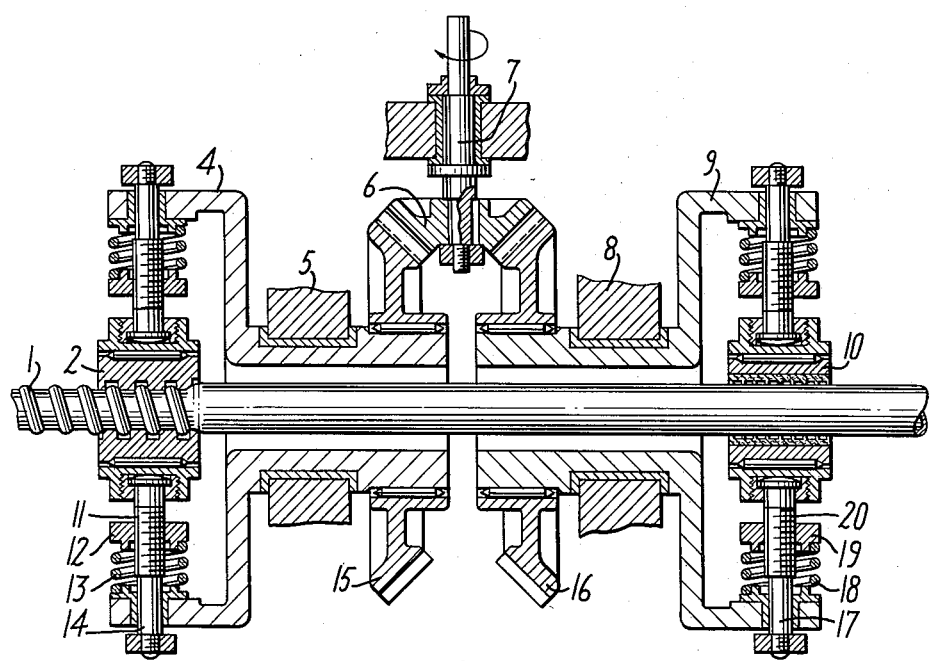
Fig. 5 shows diagrammatically a complete apparatus for the helical corrugation of the sheath.

Fig. 5 shows an illustrative embodiment of an apparatus in accordance with the invention for corrugating a cable sheath with the above-described tool and holder. In Fig. 5, the reference numeral 1 designates the sheath tube; 2 is a diagrammatic representation of the corrugating or forming tool made in one or more parts; 4 is a chuck for carrying and rotating the forming tools; 5 is a bearing for the chuck 4; 6 is a bevel wheel and 7 its driving shaft; 8 is a bearing for a chuck 9 rotating in a direction opposite to that of the chuck 4; 10 is a counter-tool (illustrated on an enlarged scale in Fig. 6); 11 represents the pressure-adjusting screws for the multipart forming tool 2, the shanks 14 of the adjusting screws 11 being guided in the chuck 4; 12 indicates the adjusting nuts upon the screws 11; 13 identifies the adjustable compression springs; 15 is a bevel wheel for driving the chuck 4; 16 is a bevel wheel for driving the chuck 9; and 17 designates the shanks of screws 20, fitted with adjusting nuts 19 for the compression springs 18 which press together the parts of the counter-tool 10 into engagement with the smooth sheath or tube to be corrugated.

Figure 6:
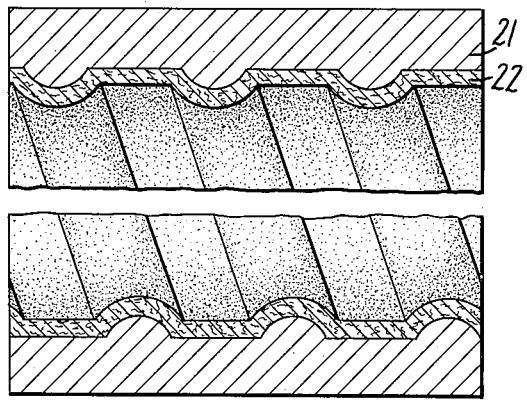
Fig. 6 is a sectional view on a larger scale of a counter-tool employed in the corrugating apparatus.

The counter-tool 10, shown on an enlarged scale in Figure 6, consists advantageously of two or more jaws 21, which may have a helical form opposite in direction to the screw-thread of the forming-tool 2, since the two tools rotate in opposite directions. The diameter of the counter-tool is such that it does not deform the sheath. The counter-tool is internally lined with a frictional material 22 which rubs upon the sheath as the tube is drawn forward into the tool 2, and at the same time neutralizes the torque produced by the forming tool.

As will be understod, it is possible, alternatively, to provide a counter-tool which removes only the torque, without drawing the tube into the forming tool. The counter-tool 10 can be constructed substantially in the same manner as the forming-tool 2, with the difference that in its operation it does not form corrugations but merely reduces the diameter of the tube. The two tools, corrugation former and counter-tool, are adapted to one another in such manner that the profile height $\delta$ according to the invention is obtained. In general, it is advantageous to produce the corrugations only by means of the forming tool 2, since they then retain the soft state of the original tube.

If the metal sheath is produced from a metal strip which is rounded to form a tube with the abutting or over-lapping edges welded together, the smooth tube is preferably corrugated only after its completion for the entire cable length, without joint or interruption.

Figure 7:
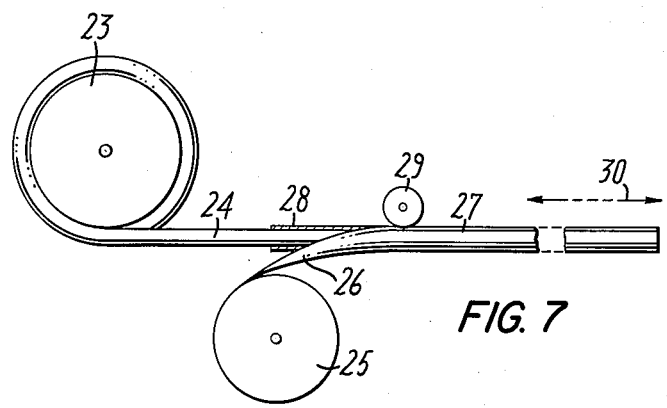
Fig. 7 shows diagrammatically the production of a tubular sheath from a metal strip.

Fig. 7 shows diagrammatically, by way of example, an arrangement for carrying out such production of the sheath. In this figure, 23 is a cable drum carrying the unsheathed cable-core 24; 25 is the supply drum for the smooth metal strip 26; 27 is the tube wound from the flat strip and provided with a welded, soldered or cemented seam; 28 is a stationary hollow mandrel, which may be provided with cooling means, about which mandrel the metal strip 26 is wound to form the tube 27 and upon which the abutting or over-lapping strip edges are welded in the cold or hot state, soldered or cemented, to form the seam. The reference numeral 29 designates a pressure roller by means of which the strip edges are pressed against or over one another and are, if desired, welded, in the cold or hot state, soldered or cemented. The laying out base for a manufacturer's length of cable is shown by the arrow at 30.

Figure 8:
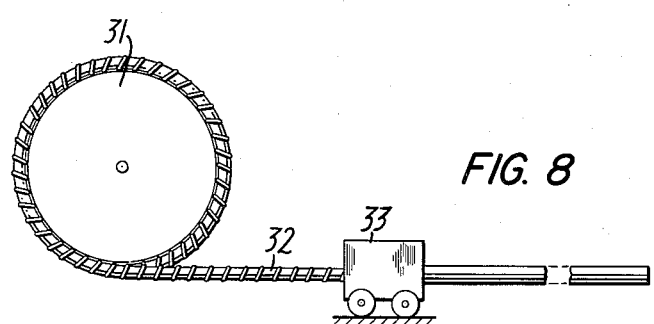
Fig. 8 is a diagrammatic view showing an installation for the helical corrugation of the tubular sheath, with the finished cable being wound upon a drum.

Fig. 8 shows diagrammatically, and by way of example only, an installation for the production of the corrugated cable-sheath wherein, 31 is a drum for winding up the finished cable 32 with the corrugated cable-sheath; 32 is the completed cable-length with the corrugated sheath; and 33 the corrugating device, which preferably runs on wheels.

As shown in Fig. 7, the cable-core is drawn out to its full length on the laying out base 30 simultaneously with the sheath which is manufactured from the strip, the sheath having an internal diameter greater than the external diameter of the cable-core. The speed for drawing out of the tube with the core disposed in it need only be adapted to the most convenient speed for the formation of the seam. The tube manufactured in this manner is closed around the core by means of the corrugating device 33, as shwon in Fig. 8, for which purpose the corrugating device can be moved along the entire cable-length. More advantageously, however, the cable is wound onto the drum 31 during the corrugation step. As will be understood, the torsional moment or torque exerted by the corrugating tool is taken up by the cable end fixed to the drum and by a movable device in which the other end of the cable is clamped, or by means of the counter-tool 10 already described. The corrugating device is preferably arranged on wheels, as the speed of winding up of the cable does not then need to conform absolutely to the speed of the corrugating device. Thus, if the drum 31 runs too quickly, or too slowly, the corrugating device 33 will run towards or away from the drum. The speed of the latter thus needs only to be regulated so that the corrugating device 33 remains substantially stationary as far as possible.

In another embodiment of the invention, the sheath-tube can be manufactured without the cable-core, laid out on the base 30, and the core then introduced into the tube. This provides the advantage that the soldering, cementing, hot-welding or cold-welding can be carried out without consideration of the delicate cable-core, which is later drawn into the completed tube.

As will be understood, it is also possible for the tube to be wound upon a drum without the core, after the seam has been formed, and for the core to be drawn into the tube after it has been reeled off the drum and payed out on the laying-out base. In this case, the tube can be manufactured at a locality remote from the laying-out base.

Such corrugated sheaths are advantageously used with all types of cable-cores. The corrugations being shallower than the deeply corrugated profiles of known sinusoidally-profiled sheaths, a heavy current or high-tension cable sheathed according to the present invention will have only relatively small hollow spaces between the core and the sheath. These cavities can easily be filled with impregnating compounds.

It will be understood that various changes and modifications in addition to those above-mentioned may be made in the embodiments described and illustrated without departing from the scope of the invention as defined in the appended claim. It will be further understood that, insofar as they are not mutually incompatible, the individual features of the various embodiments described and shown in the drawings are interchangeable with one another. It is intended, therefore, that all matter contained in the foregoing description and in the drawings shall be interpreted as illustrative only and not as limitative of the invention.

This application is a division of our co-pending application Serial No. 315,305, filed October 17, 1952.

What we claim and desire to secure by Letters Patent is:

An apparatus for the production of a helically-corrugated cable sheath on a cable core from a cylindrical tube made of a metal having a higher melting point than lead, comprising, in combination, a deforming tool for forming a helical corrugation in said tube by forcing localized portions of said tube into contact with the cable core, and a counter-tool coupled to said deforming tool and being positioned for frictional engagement with said tube, said deforming tool comprising a rotary, motor-driven helical means having a sheath-engaging surface in the form of an Archimedean spiral, the ratio of the breadth of the sheath-engaging surface of said means to the distance between two opposite portions of the deforming tool spaced circumferentially by a complete turn of the helix being approximately 0.62 to 0.38, and the radii of the Archimedean spiral at two points separated by one complete turn of the helix differing in length by about $$\sqrt{\frac{1}{4(k+1)^2}+\frac{v}{2(k+1)}}$$

times the pitch $h$ for a minimum admissible bending diameter equal to $k$ times the diameter of the cable, $k$ being the ratio of the minimum bending diameter of the outside diameter of the cable and $v$ being the ratio between the breadth of the helix to the pitch of the helix, and means for rotating said deforming tool and said counter-tool in opposite directions around said tube for balancing the respective torque produced by their engagement.

References Cited in the file of this patent

UNITED STATES PATENTS

| | | |
|---|---|---|
| 469,662 | Greenfield | Feb. 23, 1892 |
| 798,448 | Pogany | Aug. 29, 1905 |
| 1,852,921 | Dreyer | Apr. 5, 1932 |
| 1,860,989 | Brinkman | May 31, 1932 |
| 1,919,254 | Picece | July 25, 1933 |
| 2,157,598 | Fentress | May 9, 1939 |
| 2,469,565 | Logan | May 10, 1949 |